United States Patent
Willoughby et al.

(10) Patent No.: US 7,883,735 B2
(45) Date of Patent: Feb. 8, 2011

(54) APPARATUS AND METHOD FOR CURLED EXTRUDATE

(75) Inventors: Chris Willoughby, Battle Creek, MI (US); Charles A. Smith, Marshall, MI (US); Norbert Gimmler, Portage, MI (US)

(73) Assignee: Kellogg Company, Battle Creek, MI (US)

( * ) Notice: Subject to any disclaimer, the term of this patent is extended or adjusted under 35 U.S.C. 154(b) by 670 days.

(21) Appl. No.: 11/834,362

(22) Filed: Aug. 6, 2007

(65) Prior Publication Data

US 2008/0032016 A1 Feb. 7, 2008

Related U.S. Application Data

(60) Provisional application No. 60/821,628, filed on Aug. 7, 2006.

(51) Int. Cl.
*A23P 1/12* (2006.01)

(52) U.S. Cl. .................. 426/625; 426/448; 426/449; 426/450; 426/500; 426/516; 426/518; 425/301; 425/307; 425/309; 425/465; 425/466; 264/151

(58) Field of Classification Search .............. 426/231, 426/445–450, 500, 503, 516–518, 625; 425/289–316, 425/465, 466; 264/138–163
See application file for complete search history.

(56) References Cited

U.S. PATENT DOCUMENTS

| | | |
|---|---|---|
| 855,379 A | 5/1907 | Bangs |
| 1,720,097 A | 7/1929 | Scholz |
| 1,724,563 A | 8/1929 | Cooper |
| 1,747,954 A | 2/1930 | Rydberg |
| 1,765,872 A | 6/1930 | Laskey |
| 1,817,383 A | 8/1931 | Laskey |
| 1,938,773 A | 12/1933 | Ernst et al. |
| 2,113,717 A | 4/1938 | Brown |
| 2,303,888 A | 12/1942 | Miller |
| 2,361,369 A | 10/1944 | Grebe et al. |
| 2,379,347 A | 6/1945 | Fiedler |
| 2,401,236 A | 5/1946 | Fielitz |
| 2,402,462 A | 6/1946 | Sullivan |
| 2,437,460 A | 3/1948 | Francisci |
| 2,488,129 A | 11/1949 | Lande, Jr. |

(Continued)

FOREIGN PATENT DOCUMENTS

DE 1502668 8/1969

(Continued)

*Primary Examiner*—Drew E Becker
(74) *Attorney, Agent, or Firm*—Dickinson Wright PLLC

(57) ABSTRACT

An apparatus and method for producing a substantially spiral shaped food product is disclosed herein. The apparatus includes a die defining a plurality of apertures disposed in a circle about a center. The apparatus also includes at least one cutting blade disposed for rotation about the center and operable to intermittently pass fully across each of the apertures during rotation. The apparatus also includes a plurality of slicing blades arranged for individual rotation about one of the plurality of apertures. The plurality of slicing blades are also arranged for continuous extension less than fully across the one aperture. The apparatus also includes a planetary coupling arrangement operably disposed to facilitate reciprocating rotation between the at least one cutting blade and the plurality of slicing blades.

10 Claims, 3 Drawing Sheets

U.S. PATENT DOCUMENTS

| | | | |
|---|---|---|---|
| 2,597,975 A | 5/1952 | Colombo | |
| 2,744,287 A | 5/1956 | Parshall et al. | |
| 2,764,952 A | 10/1956 | Meakin | |
| 2,793,598 A | 5/1957 | Rivoche | |
| 2,853,027 A | 9/1958 | Graves | |
| 2,963,995 A | 12/1960 | Brudi | |
| 3,025,564 A | 3/1962 | Voigt | |
| 3,086,246 A | 4/1963 | Stone | |
| 3,089,194 A | 5/1963 | Goins | |
| 3,117,006 A | 1/1964 | Wenger | |
| 3,143,766 A | 8/1964 | Rohn | |
| 3,171,160 A | 3/1965 | Moyer | |
| 3,214,796 A | 11/1965 | Ginaven | |
| 3,215,094 A * | 11/1965 | Oldershaw et al. | 426/512 |
| 3,225,717 A | 12/1965 | Page | |
| 3,226,527 A | 12/1965 | Harding | |
| 3,329,101 A | 7/1967 | Urschel | |
| 3,329,998 A * | 7/1967 | Stohr | 425/71 |
| 3,333,298 A | 8/1967 | List et al. | |
| 3,337,913 A | 8/1967 | List | |
| 3,341,892 A | 9/1967 | Mayner | |
| 3,349,333 A | 10/1967 | Becker et al. | |
| 3,387,069 A * | 6/1968 | Stohr | 264/145 |
| 3,467,987 A | 9/1969 | Foster | |
| 3,476,567 A | 11/1969 | Wood, Jr. et al. | |
| 3,582,466 A | 6/1971 | Quirk | |
| 3,587,281 A | 6/1971 | Lemelson | |
| 3,596,319 A | 8/1971 | McKenica | |
| 3,605,649 A | 9/1971 | Bundus | |
| 3,624,830 A | 11/1971 | Stehower | |
| 3,646,894 A | 3/1972 | Hasten et al. | |
| 3,708,253 A | 1/1973 | Lemelson | |
| 3,711,296 A | 1/1973 | LaWarre, Sr. | |
| 3,777,600 A | 12/1973 | Long et al. | |
| 3,782,876 A | 1/1974 | Groff | |
| 3,784,533 A | 1/1974 | Mach | |
| 3,796,532 A * | 3/1974 | Needleman | 425/325 |
| 3,808,962 A | 5/1974 | Liepa | |
| 3,817,141 A | 6/1974 | Simonetti | |
| 3,823,301 A | 7/1974 | Swarat | |
| 3,828,638 A | 8/1974 | Bonney, Jr. | |
| 3,861,844 A | 1/1975 | Miller | |
| 3,867,081 A | 2/1975 | Everett | |
| 3,867,082 A | 2/1975 | Lambertus | |
| 3,886,832 A | 6/1975 | Harris | |
| 3,912,434 A | 10/1975 | Nagahara et al. | |
| 3,915,615 A | 10/1975 | Colgan | |
| 3,944,641 A | 3/1976 | Lemelson | |
| 3,976,799 A | 8/1976 | Kelly, Jr. et al. | |
| 3,998,919 A | 12/1976 | Urquhart | |
| 4,022,918 A * | 5/1977 | Miller | 426/446 |
| 4,097,212 A | 6/1978 | Morishima et al. | |
| 4,150,595 A | 4/1979 | Loffler et al. | |
| 4,152,102 A | 5/1979 | Sasiela et al. | |
| 4,179,255 A | 12/1979 | Hale | |
| 4,227,306 A | 10/1980 | Meshulam | |
| 4,240,779 A | 12/1980 | Turk | |
| 4,250,786 A | 2/1981 | Bleich | |
| 4,251,198 A | 2/1981 | Altenburg | |
| 4,254,607 A | 3/1981 | Moore | |
| 4,261,940 A | 4/1981 | Bussey, Jr. | |
| 4,262,476 A | 4/1981 | Benenati | |
| 4,300,877 A | 11/1981 | Andersen | |
| 4,305,704 A | 12/1981 | Lemelson | |
| 4,327,050 A | 4/1982 | Salmon | |
| 4,332,538 A | 6/1982 | Campbell | |
| 4,336,010 A | 6/1982 | Thompson | |
| 4,368,610 A | 1/1983 | Aono | |
| 4,395,427 A | 7/1983 | Fischer et al. | |
| 4,401,421 A | 8/1983 | Anders | |
| 4,418,086 A | 11/1983 | Marino et al. | |
| 4,422,372 A | 12/1983 | Hoezee | |
| 4,423,078 A | 12/1983 | Darley et al. | |
| 4,440,704 A | 4/1984 | Bussey, Jr. | |
| 4,462,470 A | 7/1984 | Alexander et al. | |
| 4,478,565 A | 10/1984 | Thompson | |
| 4,488,464 A | 12/1984 | Rooke et al. | |
| 4,500,271 A | 2/1985 | Smith | |
| 4,514,165 A | 4/1985 | Bussey, Jr. | |
| 4,527,382 A | 7/1985 | Aono | |
| 4,534,724 A | 8/1985 | Fischer et al. | |
| 4,536,146 A | 8/1985 | Hernandez et al. | |
| 4,543,769 A | 10/1985 | Schmitz | |
| 4,574,673 A | 3/1986 | Pearl | |
| 4,581,970 A | 4/1986 | Hanson | |
| 4,597,979 A | 7/1986 | Goglanian | |
| 4,648,828 A | 3/1987 | Abe et al. | |
| 4,653,590 A | 3/1987 | Shank | |
| 4,698,228 A | 10/1987 | Straka et al. | |
| 4,756,916 A | 7/1988 | Dreher et al. | |
| 4,778,365 A | 10/1988 | Archer | |
| 4,802,838 A * | 2/1989 | Schaaf | 425/311 |
| 4,822,546 A | 4/1989 | Lohkamp | |
| 4,847,090 A | 7/1989 | Della Posta et al. | |
| 4,850,845 A | 7/1989 | Hicks | |
| 4,882,172 A | 11/1989 | Van Alstine | |
| 4,886,441 A | 12/1989 | Lortz | |
| 4,900,572 A | 2/1990 | Repholz et al. | |
| 4,966,542 A | 10/1990 | Kobayashi | |
| 4,988,276 A | 1/1991 | Moeller | |
| 4,999,206 A | 3/1991 | Lortz | |
| 5,035,165 A | 7/1991 | Madsen | |
| 5,071,668 A | 12/1991 | Van Lengerich et al. | |
| 5,077,074 A | 12/1991 | Van Lengerich | |
| 5,124,161 A | 6/1992 | Van Lengerich et al. | |
| 5,304,055 A | 4/1994 | Van Lengerich et al. | |
| 5,435,714 A * | 7/1995 | Van Lengerich et al. | 425/313 |
| 5,641,529 A * | 6/1997 | Kunas | 426/516 |
| 5,888,558 A | 3/1999 | Janot et al. | |
| 6,770,233 B2 * | 8/2004 | Bortone et al. | 264/167 |
| 6,797,213 B2 * | 9/2004 | Bortone et al. | 264/143 |
| 7,293,974 B2 * | 11/2007 | Bortone et al. | 425/297 |

FOREIGN PATENT DOCUMENTS

| | | |
|---|---|---|
| DE | 2050856 | 4/1972 |
| DE | 2301774 | 7/1974 |
| DE | 2616814 | 10/1977 |
| DE | 3131983 | 2/1983 |
| EP | 0218992 | 4/1987 |
| EP | 0218993 | 4/1987 |
| EP | 0275878 | 7/1988 |
| GB | 2136666 | 9/1984 |
| GB | 2136666 A | 9/1984 |
| GB | 2172541 | 9/1986 |
| GB | 2172541 A | 9/1986 |
| JP | 61-274673 | 12/1986 |
| JP | 61274673 | 12/1986 |
| JP | 61280260 | 12/1986 |
| JP | 61298373 | 9/1987 |
| WO | 8606327 | 11/1986 |

* cited by examiner

APPARATUS AND METHOD FOR CURLED EXTRUDATE

CROSS-REFERENCE TO RELATED APPLICATIONS

This application claims the benefit of U.S. Provisional Patent Application Ser. No. 60/821,628 for an APPARATUS AND METHOD FOR CURLED EXTRUDATE, filed on Aug. 7, 2006, which is hereby incorporated by reference in its entirety.

BACKGROUND OF THE INVENTION

1. Field of the Invention

The invention relates to extruded products and more particularly to processing a stream of product from an extruder to achieve a desired shape.

2. Description of the Related Art

Extruders are used in the preparation of various products, including food products such as ready-to-eat ("R-T-E") cereals. Extruders such as cooker extruders can be desirable because a single machine can produce large quantities of a cooked dough in a short period of time. Such cooker extruders can be used to prepare cooked dough extrudates which can thereafter be formed into individual cereal or snack pieces. The formation of such pieces may involve puffing the pieces to form finished puffed R-T-E cereals. In another variation, the capabilities of the extruder and the characteristics of the cooked cereal dough are such that the dough puffs immediately upon being extruded and is cut into individual puffed pieces at the die head.

SUMMARY OF THE INVENTION

In summary, the invention is an apparatus and method for producing a substantially spiral shaped food product. The apparatus includes a die defining a plurality of apertures disposed in a circle about a center. The apparatus also includes at least one cutting blade disposed for rotation about the center and operable to intermittently pass fully across each of the apertures during rotation. The apparatus also includes a plurality of slicing blades arranged for individual rotation about one of the plurality of apertures. The plurality of slicing blades are also arranged for continuous extension less than fully across the one aperture. The apparatus also includes a planetary coupling arrangement operably disposed to facilitate reciprocating rotation between the at least one cutting blade and the plurality of slicing blades.

BRIEF DESCRIPTION OF THE DRAWINGS

Applications of the present invention will become apparent to those skilled in the art when the following description of an exemplary embodiment for practicing the invention is read in conjunction with the accompanying drawings.

DETAILED DESCRIPTION OF AN EXEMPLARY EMBODIMENT

Figure 1:
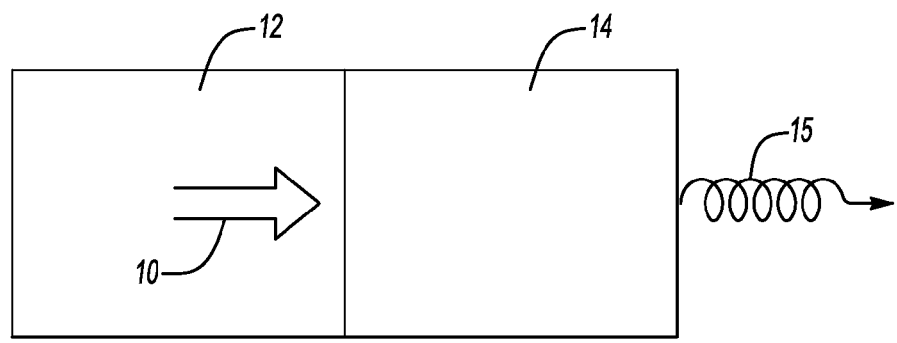
FIG. 1 is a schematic view of an exemplary operating embodiment of the invention.

Referring now to FIG. 1, in an exemplary embodiment of the invention, a food mass 10 is moved through an extruder 12 to a shaping assembly 14 and turned into a helically-shaped food product 15. The food mass 10 is worked by one or more screws in the extruder 12. The food mass 10 is subject to relatively high pressure such that water within the food mass 10 is superheated. The food mass 10 can be formulated such that the resulting discrete food product 15 is a snack piece or a cereal piece or any other kind of edible item.

Figure 2:
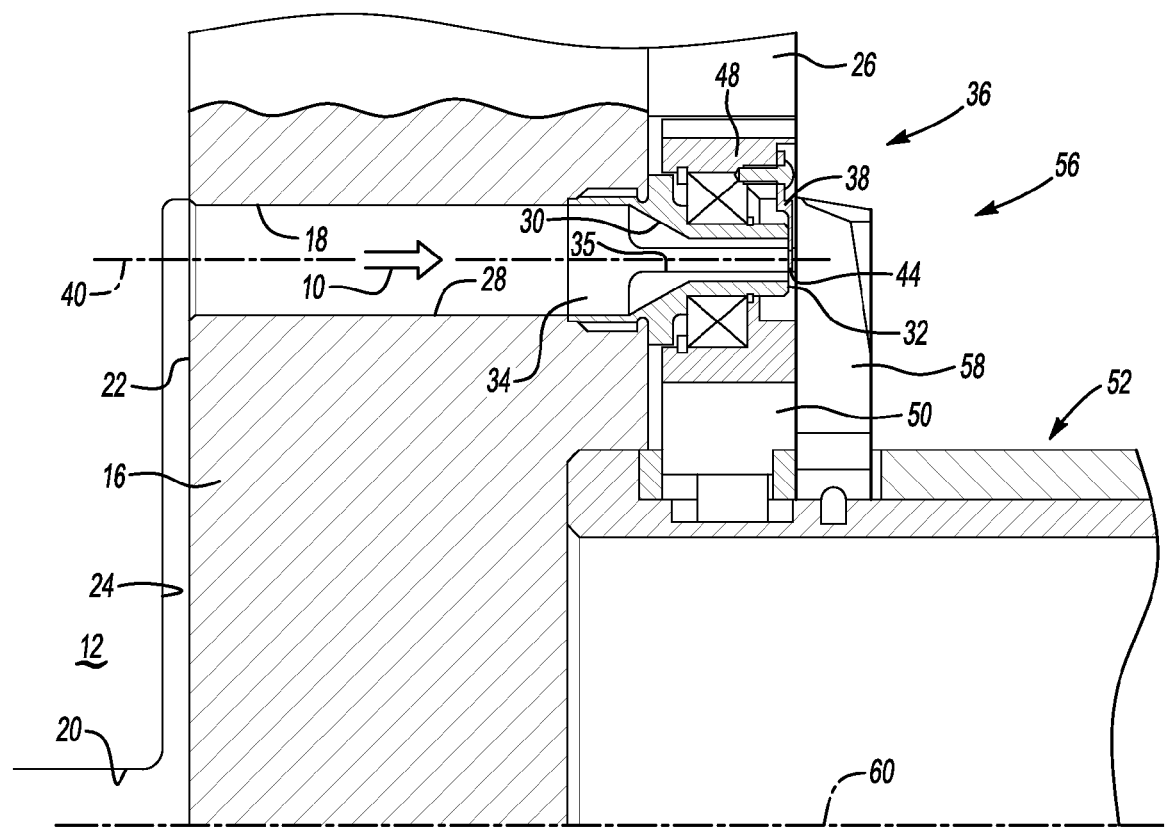
FIG. 2 is a cross-sectional view of a shaping assembly having a shaping tool according to the exemplary embodiment of the invention.

Referring now to FIG. 2, in the exemplary embodiment of a shaping tool, the shaping assembly 14 includes a channeling die plate 16 cooperating with the extruder 12 and forming one or more exit ports 18. An outlet 20 of the extruder 12 opens to a surface 22 of the channeling die plate 16. The food mass 10, still at high pressure, flows along the surface 22 to the one or more exit ports 18. The food mass 10 moves through a channel 24 between the outlet 20 of the extruder 12 and the exit port 18. The channel 24 can be defined by the flat surface 22 and a groove formed in the extruder 12, or by a flat surface of the extruder 12 and a groove in the surface 22, or by an additional plate disposed between the extruder 12 and the channeling die plate 16.

In the exemplary embodiment of the invention, the shaping assembly 14 includes a shaping tool supporting plate 26 adjacent to the channeling die plate 16. The plates 16, 26 define apertures 28, 30 aligned and in communication with one another to define the exit port 18. The aperture 30 of the plate 26 narrows with the respect to the aperture 28 prior to an exit 32 of the exit port 18 to increase the pressure of the food mass 10.

In an alternative embodiment of the invention, one or more coloring materials can be added to the food mass 10 prior to the exit 32 to modify the visual appearance of the finished food product 15. Also, one or more substreams of the food mass 10 can be combined to modify the taste, appearance and/or texture of the finished food product 15. In the exemplary embodiment of the invention, an insert 34 is disposed in the exit port 18 to accommodate the addition of two different colors, a first color on the outside of the food product immediately emerging from the exit 32 and a second color on the inside of the food product immediately emerging from the exit 32. The insert 34 includes a shaft portion 35 that is centered and extends along an axis 40 of the exit port 18.

The food mass 10 exits high pressure conditions at the exit 32. The shaping assembly 14 is disposed adjacent the exit 32 and includes a shaping tool 36 at the exit 32 to induce a spiral or helix shape in the food mass 10 exiting the exit 32. The shaping tool 36 of the exemplary embodiment of the invention includes a blade 38 extending at least partially across the exit 32. The shaping tool 36 rotates about a center axis 40 of the exit 32 as the food mass 10 passes out of the exit 32.

Figure 3:
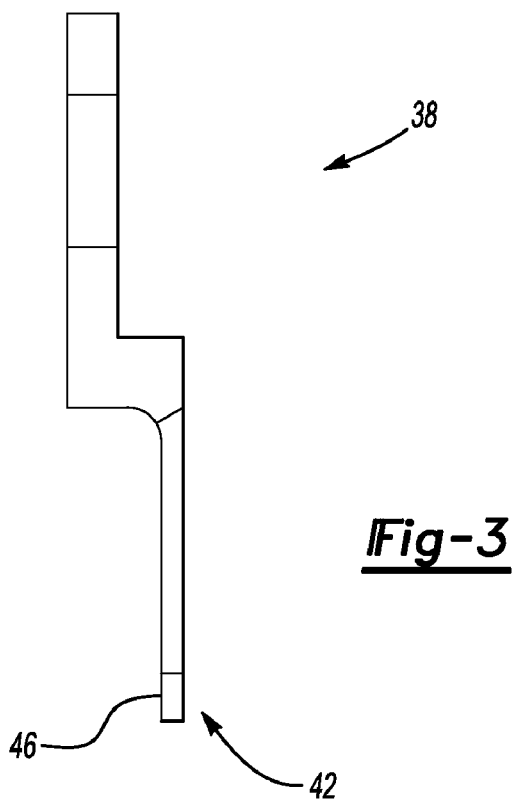
FIG. 3 is left-hand view of a blade of the shaping tool according the exemplary embodiment of the invention.
Figure 4:
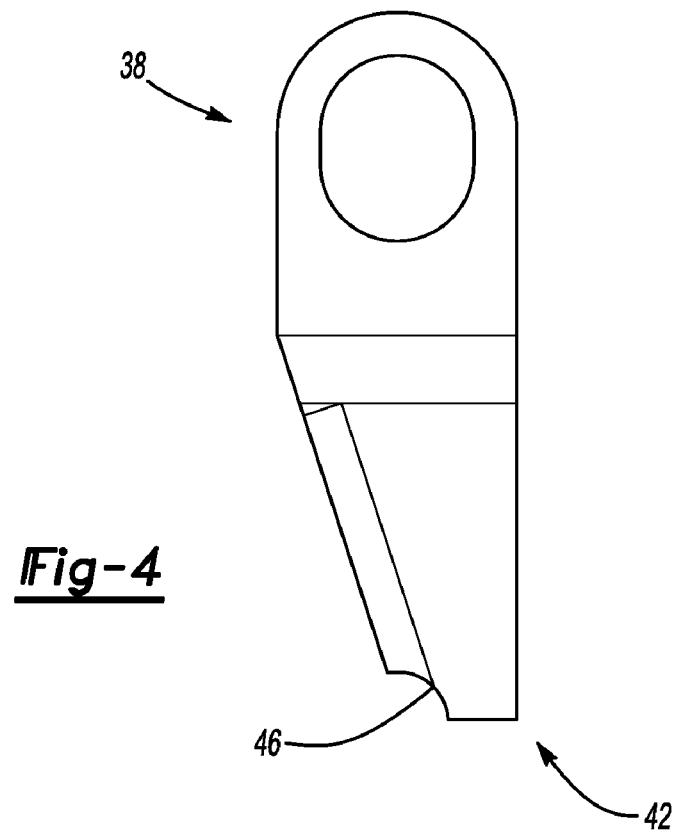
FIG. 4 is a front view of the blade shown in FIG. 3.

In the exemplary embodiment of the invention, the blade 38 extends half-way across the exit 32. A free end or cantilevered end 42 of the blade 38 (shown in FIGS. 3 and 4) is disposed in a groove 44 of the shaft portion 35 to reduce the likelihood of deflection of the blade 38. The groove 44 is annular and extends around the axis 40. The exemplary blade 38 includes a notch 46 shaped to correspond to the shape of the bottom of the groove 44. In one possible alternative embodiment of the invention, a blade could extend fully across the exit 32 in place of the blade 38 that extends partially across the exit 32.

Figure 5:
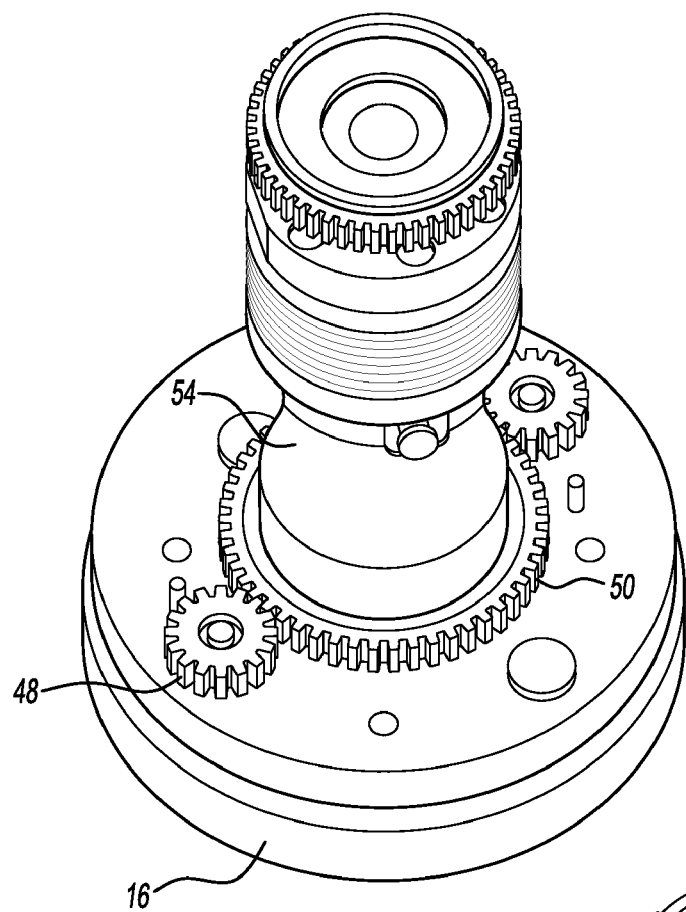
FIG. 5 is a first perspective view of the exemplary shaping assembly wherein a shaping tool supporting plate has been removed.
Figure 6:
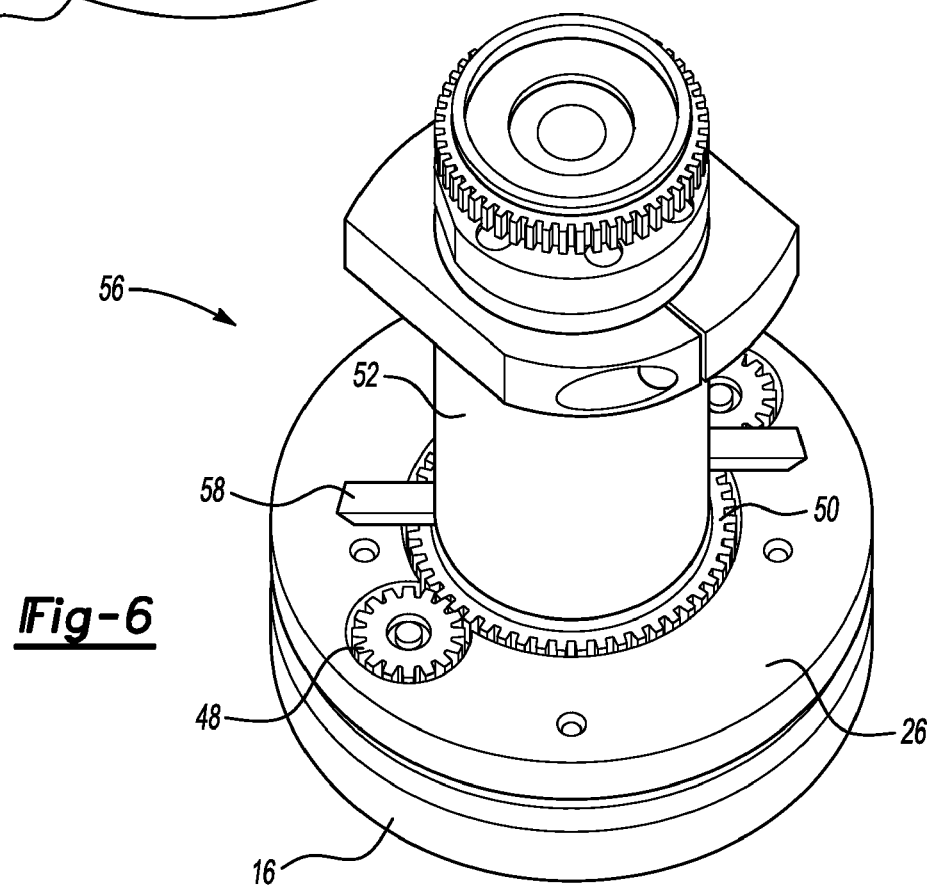
FIG. 6 is a second perspective view of the exemplary shaping assembly with the shaping tool supporting plate.

The shaping tool 36 is fixed to a satellite gear 48. The shaping tool 36 is releasably fixed to the gear 48 such that the shaping tool 36 can be replaced as required. The exemplary shaping tool 36 is rotated about the axis 40 by the cooperation between the satellite gear 48, a primary or sun gear 50, a spindle 52, and a motor 54 (shown in FIG. 5). The motor 54 rotates the spindle 52. The spindle 52 and the primary gear 50 are fixed together for concurrent rotation with one another about an axis 60. The primary gear 50 and the satellite gear 48 are engaged for reciprocating rotation with respect to one another.

The plates 16 and 26 include a plurality of exit ports similar to exit port 18; the exit ports being arrayed around the axis 20.

The arrangement and operation of the shaping tool 36 results in the food mass 10 being curled, spiraled, and/or helical shaped downstream of the shaping tool 36. The speed of rotation of the shaping tool 36 about the axis 40 can be varied to vary the extent or degree of curling. In another words, the relative tightness of the helix can be varied by varying the speed of rotation of the shaping tool 36. Also, the speed at which the food mass 10 exits the exit 32 can be varied in combination with varying the speed of rotation of the shaping tool 36 to vary the degree of curling.

The shaping assembly 14 of the exemplary embodiment of the invention includes a cutter 56 to separate the stream of the food mass 10 into discrete food pieces 15. The cutter 56 can include one or more blades 58 rotating about the axis 60. The axis 60 the exemplary embodiment of the invention is the center axis of the extruder 12 and is spaced from and parallel to the axis 40. The cutter 56 is fixed with respect to the gear 50 and the spindle 52 for concurrent rotation. The speed of rotation of the cutter 56 about the axis 60 can be varied relative to the speed of rotation of the shaping tool 36 by modifying the gear teeth, or gear ratio, of the gears 48 and 50.

Thus, a planetary coupling arrangement is defined between the gears 48, 50 to facilitate reciprocating rotation between the cutting blade 58 and the shaping blade 38. Embodiments of the invention can include a plurality of shaping blades 38 and a plurality of cutting blades 58. The planetary coupling arrangement allows for a compact arrangement for a plurality of food streams exiting a plurality of exit ports.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What can be claimed is:

1. A method for producing a substantially spiral shaped food product comprising:
   defining an aperture centered on a center axis with a die;
   disposing a slicing blade of a shaping tool over at least a portion of the aperture;
   moving a stream of food mass out of the aperture;
   rotating the slicing blade about the center axis to shape the stream of food mass into a spiral shaped stream of food mass;
   rotating a cutter having a cutting blade about a cutter axis being spaced from the center axis to intermittently pass across the aperture during rotation and separate the spiral shaped stream of food mass into the discrete spiral shaped food product; and
   engaging the shaping tool and cutter through a planetary coupling arrangement to facilitate reciprocating rotation between the cutting blade and the slicing blade to create the discrete spiral shaped food product.

2. The method of claim 1 further including the step of:
   concurrently rotating the cutting blade about the cutter axis and the slicing blade about the center axis.

3. The method of claim 2 further including the step of:
   varying a speed of rotation of the cutting blade about the cutter axis and the slicing blade about the center axis to vary the degree of the spiral of the food product.

4. The method of claim 2 further including the step of:
   varying a gear ratio of the planetary coupling arrangement to vary the degree of the spiral of the food product.

5. The method of claim 1 further including the step of:
   varying a rate of movement of the stream of food mass out of the aperture to vary the degree of the spiral of the food product.

6. The method of claim 1 further including the step of:
   arraying a plurality of apertures about the cutter axis, each of the plurality of apertures being centered on a center axis.

7. The method of claim 6 wherein the step of disposing a slicing blade is further defined as:
   disposing a slicing blade of a shaping tool over at least a portion of the aperture at each of the plurality of apertures.

8. The method of claim 7 wherein the step of moving a stream of food mass is further defined as:
   moving a stream of food mass out of each of the plurality of apertures.

9. The method of claim 8 wherein the step of rotating the slicing blade is further defined as:
   rotating each of the slicing blades disposed about the center axis of each of the plurality of apertures to shape the each of the streams of food mass into a spiral shaped stream of food mass.

10. The method of claim 9 wherein the step of rotating the cutter step is further defined as:
    rotating a cutter having at least one cutting blade about a cutter axis being spaced from the center axis to intermittently pass across the plurality of apertures during rotation and separate the spiral shaped streams of food mass into the discrete spiral shaped food products.

* * * * *